(12) United States Patent
Rodorff (10) Patent No.: US 8,452,977 B2
(45) Date of Patent: May 28, 2013

(54) COMPUTER SYSTEM AND METHOD FOR STORING DATA

(75) Inventor: Werner Rodorff, Bensheim (DE)

(73) Assignee: vita-X AG, Koblenz (DE)

( * ) Notice: Subject to any disclaimer, the term of this patent is extended or adjusted under 35 U.S.C. 154(b) by 617 days.

(21) Appl. No.: 12/532,507

(22) PCT Filed: Mar. 28, 2008

(86) PCT No.: PCT/EP2008/053705
§ 371 (c)(1),
(2), (4) Date: May 14, 2010

(87) PCT Pub. No.: WO2008/125455
PCT Pub. Date: Oct. 23, 2008

(65) Prior Publication Data
US 2010/0241866 A1 Sep. 23, 2010

(30) Foreign Application Priority Data
Apr. 17, 2007 (DE) .......................... 10 2007 018 403

(51) Int. Cl.
*G06F 21/00* (2006.01)

(52) U.S. Cl.
USPC .............. 713/182; 380/44; 380/278; 713/185

(58) Field of Classification Search
USPC ................................ 713/182; 380/44, 278
See application file for complete search history.

(56) References Cited

U.S. PATENT DOCUMENTS

| | | | |
|---|---|---|---|
| 6,049,612 A | | 4/2000 | Fielder et al. |
| 7,702,628 B1 * | | 4/2010 | Luchangco et al. ... 707/999.006 |
| 2001/0042204 A1 | | 11/2001 | Blaker et al. |
| 2003/0081787 A1 * | 5/2003 | Kallahalla et al. ............ 380/278 |
| 2005/0018842 A1 * | 1/2005 | Fu et al. .......................... 380/44 |
| 2005/0043964 A1 | 2/2005 | Thielscher et al. |
| 2005/0147113 A1 * | 7/2005 | Brown .......................... 370/428 |
| 2007/0053516 A1 * | 3/2007 | Katoozi et al. ................ 380/259 |
| 2007/0233612 A1 * | 10/2007 | Barrus et al. .................... 705/71 |

FOREIGN PATENT DOCUMENTS

| | | |
|---|---|---|
| DE | 102004051296 B3 | 5/2006 |
| EP | 0781428 B1 | 2/1998 |
| EP | 1650630 A | 4/2006 |
| WO | 9608755 A1 | 3/1996 |
| WO | 9847259 A | 10/1998 |

(Continued)

OTHER PUBLICATIONS

Wang, "SigFree: A Signature-Free Buffer Overflow Attack Blocker", Jan.-Mar. 2010, IEEE Secure Computing, vol. 7, pp. 65-79.*

(Continued)

*Primary Examiner* — Taghi Arani
*Assistant Examiner* — Gregory Lane
(74) *Attorney, Agent, or Firm* — Matthew B. Dernier, Esq.; Gibson & Dernier LLP (57) ABSTRACT

A method is provided for generating a first key to encode and/or decode data and a first pointer, with said data stored and/or storable on a first data processing system in a memory area identified by said first pointer, comprising the following steps: recursive generating of said first key from a second key, recursive generating of said first pointer from a second pointer, with the number of recursions for implementing the recursive generating of said first key and said first pointer determined by an index value.

14 Claims, 4 Drawing Sheets

FOREIGN PATENT DOCUMENTS

| | | |
|---|---|---|
| WO | 0106468 A1 | 1/2001 |
| WO | 0207040 A1 | 1/2002 |
| WO | 03034294 A2 | 4/2003 |

OTHER PUBLICATIONS

International Search Report for corresponding application PCT/EP2008/053705, dated Oct. 9, 2008.

Schneier B. Ed, "Applied Cryptography, Passage" Applied Cryptography. Protocols, Algorithms, and Source Code in C, John Wiley & Sons, pp. 173, 174, 176-181 (1996) NY.

Luc Bouganim et al., "Chip-Secured Data Access: Confidential Data on Untrusted Servers" Proceedings of the International Conference on Very Largedata Bases, pp. 1-12 (2002).

Maurer W. D., et al., "Hash Table Methods" ACM Computing Surveys, vol. 7, No. 1, pp. 7-19 (1975) NY.

* cited by examiner

COMPUTER SYSTEM AND METHOD FOR STORING DATA

BACKGROUND

The invention relates to a method for generating a key to encode and/or decode data, a portable data carrier with a processor, a data processing device as well as a computer program product.

Various types of chip cards are known from prior art. The "Smart Card Handbook" by Wolfgang Rankl, Wolfgang Effing, Carl Hanser Verlag, 1999, provides a general overview of chip cards in this connection.

One field of application of chip cards is the use as an electronic health service smart card, which is to replace the health insurance card in Germany in the future. The problem, however, is that chip cards generally have relatively limited storage capacity. Preferably, it is therefore suggested that only the patient's name, residence, health insurance, and a few other data that require only little storage space be stored on the chip card.

However, to make additional extensive patient data, such as for example x-rays, diagnostic data and the like, via the electronic health service smart card available, the use of additional mass storage media in conjunction with the electronic health service smart card was suggested in this regard. EP 0 781 428 B1, for example, discloses the additional use of a mass data carrier, the disadvantage being that the patient must carry the mass data carrier, for example during a doctor's visit, in addition to his electronic health service smart card.

Additional applications of chip cards for patient data are familiar from WO 03/034294 A2, WO 02/07040 A1 and WO 01/06468 A1.

DE 10 2004 051 296 B3 discloses a computer system that centrally stores patient data by using a data server and a directory server. The patient data are stored on the data server in encoded form, and the purpose of the directory server is to access the encoded data by using a chip card.

US 2003/0081787 A1 discloses a security module to improve key management for encoded files, with said key management based on the recursive generating of keys.

In contrast, the aim of the invention is to create an improved method for storing and querying data, improved data carrier with a processor required to this end, an improved data processing device, as well as corresponding improved computer program products.

SUMMARY OF THE INVENTION

According to the invention, a method for generating a first key to encode and/or decode data and a first pointer is created, with said data stored and/or storable on a first data processing system in a memory area identified by said first pointer. Said method comprises the steps of the recursive generating of the first key from a second key and the recursive generating of the first pointer from a second pointer. In this connection, the number of recursions to implement the recursive generating of the first key and the first pointer is determined by the index value.

The recursive generating of the first key from the second key and the recursive generating of the first pointer from the second pointer comprises the steps of generating the first key by using the second key and a third key and the generating of the first pointer by using the second pointer and a fourth key. Furthermore, the following additional steps are carried out, with said additional steps being repeated as frequently as the number that corresponds to the index value: a new first key is generated by using the earlier generated first key and the second key, and a new first pointer is generated by using the earlier generated first pointer and the fourth key.

The advantage of the method for generating the first key and the first pointer according to the invention is that any number of keys and pointers can be generated and used to encode and store data. Since any used key and pointer can be recursively determined from the second, third and fourth key, as well as from the second pointer, extensive storing of a multitude of keys and pointers—as required for encoding and central storing of data on a data server—can be abandoned. Even with knowledge of any first key and an associated first pointer it is not possible to draw conclusions to other first pointers and keys without knowing the second, third and fourth key as well as the second pointer used to store other data on the data server. Only the holder of the second, third and fourth key as well as the second pointer is able to calculate additional first keys and first pointers recursively on the basis of a first key and a first pointer.

According to one embodiment of the invention, the index value is increased by one, and a new additional first pointer is generated from the first pointer generated one recursion step earlier, with the earlier generated first pointer discarded, when the first key and the first pointer generated one recursion step earlier correspond to a first pointer previously generated in any recursion step and to the first key generated earlier in said random recursion step.

This prevents the occurrence of multiple identical pointer/key pairs, which would make it impossible to clearly separate datasets stored in a memory area identified by the first pointer from one another. However, this is relevant, when multiple datasets from one and the same patient show the same pointer and the same encoding.

According to one embodiment of the invention, generating the first key and/or generating the first pointer takes place by using a hash function. The advantage of hash functions in this regard is that they calculate values simply and quickly. Using the hash function further has the advantage that is almost impossible to recalculate the hash value's original underlying dataset, and thus already generated or initial keys or pointers can no longer be ascertained. This guarantees a high level of security.

According to one embodiment of the invention, the data comprise for example a patient's medical data. The data further comprise a one-to-one patient identification. The advantage of using a one-to-one patient identification is that, in case patient data of two patients with the same first key and the same first pointer were stored, such data can be attached to the respective patient following decoding of such data based on the one-to-one patient identification.

According to one embodiment of the invention, the second key, the third key, the fourth key, the second pointer, the index value and the one-to-one patient identification are stored in a memory area of a portable data carrier based on personalization, with said portable data carrier comprising a processor, and with generating the first key and generating the second key carried out by said processor. In this connection, the portable data carrier comprising the processor preferably involves a chip or smart card. Alternatively, however, a multitude of other portable data carriers with integrated processor are also conceivable. This comprises, for example, the integration of mobile radio devices, wrist watches, USB sticks and much more. Said keys, the second pointer, the index value, and the one-to-one patient identification are generated in an individually personalized manner for the patient, for example in a doctor's office, and stored on the chip card. To this end, the relevant data should be generated such that such data are of a random nature, and thus neither conclusions can be drawn from any personal data to such data, nor conversely, personal data can be derived from such data.

According to one embodiment of the invention, generating the one-to-one patient identification comprises the one-time creation of a patient identification by means of a second data processing system, the creation of an identification from the generated patient identification by means of the second data processing system, the transfer of the identification to the first data processing system and checking a list of the first data processing system for the presence of the identification, with the earlier steps repeated if the identification is present, with the identification stored in the list in the absence of said identification.

The advantage of the method to generate the one-to-one patient identification according to the invention is that issuing two identical patient identifications to two different patients can be ruled out with near absolute certainty. Preferably, the identification is generated from the patient identification, for example, by means of a standard hash function such as, for example, the RIPEMD-256 hash function. Since only the hash value of the patient identification is transmitted to the second data processing system and checked by the latter for possibly existing duplicates, a high level of security, even during the transmission of the identification is ensured, since the patient identification does not leave the second data processing system. The corresponding patient identification can also not be calculated back from the generated hash value, which guards against misuse.

According to one embodiment of the invention, storing the data in the first data processing system comprises the steps of assigning an index value to the data, with the index value being increased by one for data to be newly stored, and the new index value stored on the portable data carrier. In a further step, the data are encoded by means of the earlier recursively generated first key and stored in encoded form in a memory area of the first data processing system identified by the recursively generated first pointer.

Since the first key and the first pointer are recursively generated in the processor of the chip card, the second, third and fourths keys as well as the second pointer used for this purpose never have to leave the chip card, which guards against unauthorized spying out of said keys and said pointer. If unauthorized persons still gain access to the first data processing system, such persons only find a multitude of non-contiguous memory areas with corresponding encoded data. However, even if one of these datasets is decoded, drawing conclusions to a patient associated with it is not possible. To be sure, the decoded data contain a one-to-one patient identification, which however does not allow drawing conclusions to personal data. It also not possible to draw conclusions to additional datasets associated with the patient once the dataset is decoded. Such datasets are scattered and stored in various, preferably non-contiguous memory areas of the first data processing system.

Avoiding the extensive management of key and pointer combinations for a patient is a further advantage of the method for storing data according to the invention. For each new dataset to be stored the newly required pointer/key pair to store the new dataset to be stored is calculated on the basis of an initial set of pointers and keys.

According to one embodiment of the invention, querying the data stored in the first data processing system comprises the steps of querying the encoded data by a memory area of the first data processing system identified by a recursively generated first pointer as well as the decoding of the encoded data by means of the recursively generated first key. Thus, querying patient data requires knowledge of the second, third and fourth key as well as the second pointer. If, in this process, said data are stored on the portable data carrier such that they cannot be read out, and the processor of the portable data carrier outputs only the generated hashed first pointers and the first keys, querying patient data is possible only by using the personal chip card.

According to one embodiment of the invention, storing the data further comprises the storage of metadata in a memory area of the first data processing system identified by the recursively generated first pointer, with said metadata linked to the data and stored in an unencoded form. Querying the data also comprises the additional step of separately querying the metadata by a memory area of the first data processing system identified by the recursively generated first pointer, with said metadata linked to the data in an unencoded form. The resulting advantage is that the data to be downloaded can be selected in advance based on the metadata instead of downloading complete, possibly very extensive datasets to a doctor's computer. The metadata may for example comprise clearly descriptive terms that also provide information—possibly by using a doctor-specific code—about a code designation, e.g. the clinical picture or diagnostic method shown by the corresponding data.

It is also possible to incorporate the category of the data into the metadata. For example, such a category indicates if data specific to dentistry, urology, gynecology or other special fields are concerned. Metadata may further indicate, if for example prescription data, diagnosis data or image data are involved. Finally, only patient data of a patient would typically be downloaded and decoded, for example, in a dentist office that carry as metadata the information "dental data". This avoids unnecessary data traffic, and the dentist office's system resources required to decode the data are reduced.

According to one embodiment of the invention, the encoded data intended for storage in the memory area of the first data processing system identified by the recursively generated first pointer are provided with a marker and transmitted to the first data processing system. In this process, data stored in the first data processing system are modified in the memory area identified by the recursively generated first pointer on the basis of their marking. Such a modification comprises deleting the data and/or processing the data and/or adding data, in each case on the basis of said marker.

Any modification of data is logged in the first data processing system. Using the marker—transferred along with the data to the first data processing system—has the advantage that high flexibility is guaranteed in terms of storing the data in the first data processing system. For example, if data are misentered, such erroneously entered data can again be removed from the data processing system, or historically stored in a second memory area for logging purposes. It is also possible to subsequently add inadvertently forgotten data that were entered during a treatment but not transmitted to the data processing system following such treatment. Of course, it is also possible to subsequently correct an erroneously made diagnosis through retransmission of the data. However, to guard against misuse, permanent logging of the modifications to the data in the data processing system is also provided. Thus, in case of doubt, possible misuse can be inferred. However, it should be noted that, preferably, newly entered data are always stored in a new memory area of the first data processing system. This ensures a complete overview over all health-related activities at all times.

According to one embodiment of the invention, the second data processing system performs the encoding and/or decoding and/or querying and/or storing of the data. To this end, such a second data processing system is embodied, for example, by the physicians' information system, or by the physician's computer at the doctor's office. According to one embodiment of the invention, non-decodable portions of the received data are discarded by means of the recursively generated first key. Furthermore, decoded data are discarded by means of the recursively generated first key, if such decoded data include a patient identification, with said patient identification not corresponding to the patient identification stored on the portable data carrier. These two steps are absolutely necessary, since, generally, hash functions are not necessarily collision free. This means that there is an extremely low probability that one and the same hash value can be generated by the same hash function with different source data. Based on the fact, however, that the data comprise the one-to-one patient identification, it is possible that two datasets from different patients that are stored in the same memory area of the first data processing system with the encoding can be distinguished from each other. If said two datasets are stored with a different encoding, it is possible to distinguish and assign the corresponding datasets already due to their decodability.

In a further aspect the invention relates to a portable data carrier comprising at least one processor for generating a first key to encode and/or decode data and a first pointer, with said data stored and/or storable on a first data processing system in a memory area identified by the first pointer, comprising means for the recursive generating of the first key from a second key and means for the recursive generating of the first pointer from a second pointer, with the number of recursions to implement the recursive generating of the first key and the first pointer determined by an index value.

According to one embodiment of the invention, the portable data carrier including processor further comprises means for generating the first key by using the second key and a third key, means for generating the first pointer by using the second pointer and a fourth key, means for newly generating the first key by using the previously generated first key and the second key, as well as means for newly generating the first pointer by using the previously generated first pointer and the fourth key.

According to one embodiment of the invention, the first key and/or the first pointer can be generated by the means for generating the first key and/or the means for generating the first pointer by using a hash function.

According to one embodiment of the invention, the data comprise patient data. Preferably, the data further comprise a one-to-one patient identification.

According to one embodiment of the invention, the second key and the third key and the fourth key and the second pointer and the index value and the one-to-one patient identification are stored in a memory area of the portable data carrier due to personalization, with the processor developed for generating the first key and/or the first pointer. In this connection, the portable data carrier is developed with the processor by means of a chip card.

In a further aspect the invention relates to a data processing device comprising means for communicating with a portable data carrier with a processor according to the invention with means for assigning an index value to the data, with said index value increased by one for data to be newly stored, and said new index value stored on said portable data carrier. The data processing device further comprises means for encoding the data with the recursively generated first key, as well as means to store the encoded data in a memory area of the first data processing system identified by the recursively generated first pointer. The data processing device further comprises means for encoding the data with the recursively generated first key as well as means for storing said encoded data in a memory area of the first data processing system identified by the recursively generated first pointer.

According to one embodiment of the invention, the data processing device further comprises means for querying the encoded data by a memory area of the first data processing system identified by the recursively generated first pointer, as well as means for decoding said encoded data by means of the recursively generated first key.

According to one embodiment of the invention, the data processing device further comprises means for additionally storing unencoded metadata in the memory area of the first data processing system identified by the recursively generated first pointer, with said metadata storable in a linked form with the data. According to one embodiment of the invention, the data processing device further comprises means for querying the unencoded metadata by a memory area of the first data processing system identified by the recursively generated first pointer, with said metadata linked with the data in an unencoded form.

In a further aspect the invention relates to a computer program product with instructions executable by a processor for implementing the method for storing and querying data according to the invention.

BRIEF DESCRIPTION OF THE DRAWINGS

In the following preferred embodiments of the invention will be explained in detail on the basis of the drawings.

DETAILED DESCRIPTION OF THE INVENTION

Figure 1:
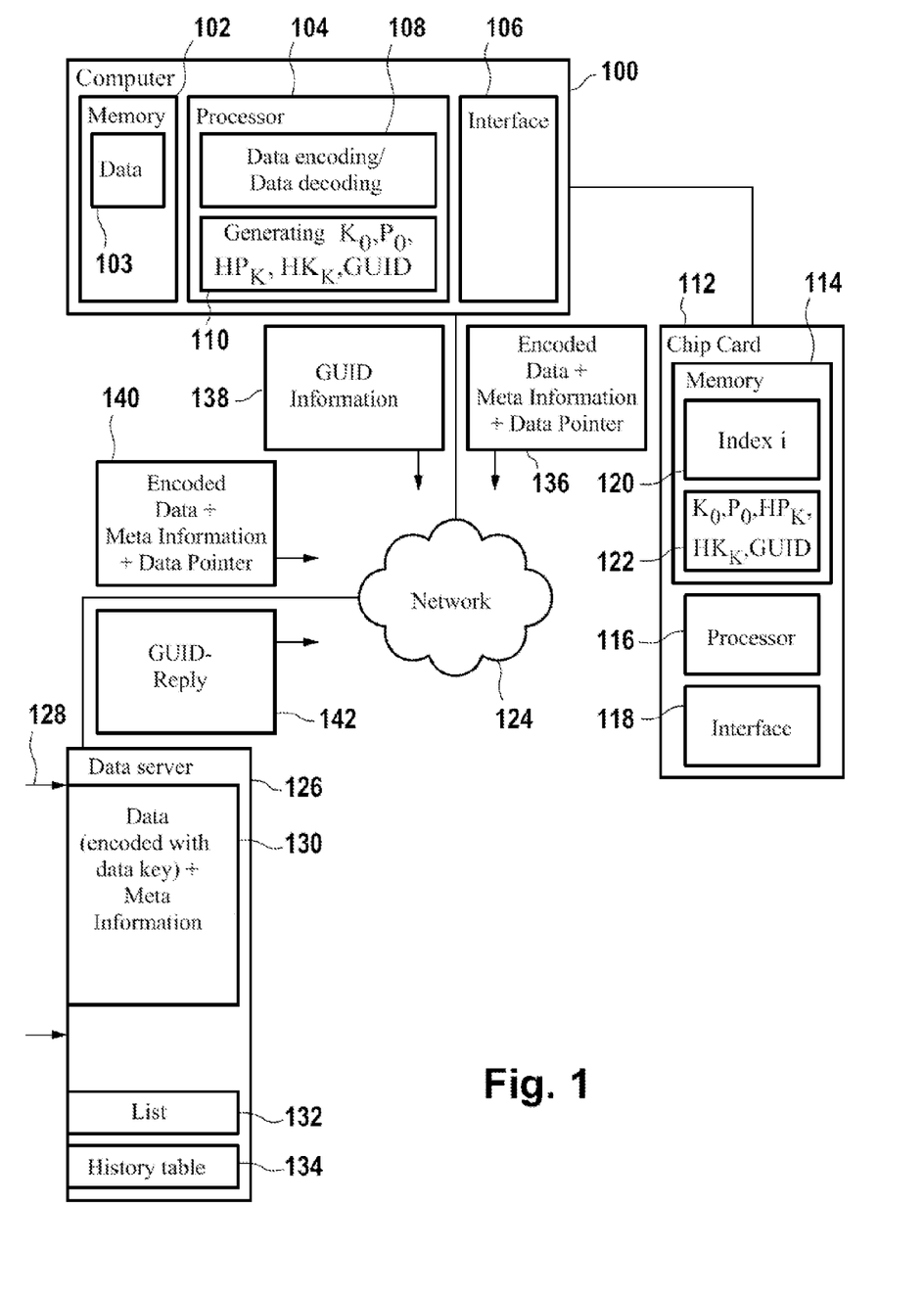
FIG. 1: shows a block diagram of an embodiment of a data processing system for implementing an embodiment of a method according to the invention.

FIG. 1 shows a block diagram of an embodiment of a data processing system for implementing an embodiment of a method according to the invention. Said data processing system comprises a computer 100 linked to a data server 126 via a network 124. Said computer 100 comprises a memory 102 that contains data 103. Such data concern, for example, patient data such as x-rays, diagnostic data, prescription data, or the like. Said data may, for example, be entered into the computer 100 by an attending physician.

Alternatively or additionally, said computer 100 is linked to the medical practice EDP system of the doctor's office and automatically receives the data 103 via the network 124. Further, it is also possible to feed digital image data into the computer 100 supplied by a medical device, such as for example a x-ray device, computer tomograph, magnetic resonance tomograph, or ultrasound device. This in turn can be automatically accomplished via a network or by importing mass data into the computer 100 stored on a CD-ROM or DVD, for example. It is further also possible for the computer to be integrated into such a medical device or to be directly linked to such a medical device that generates the data 103.

The computer 100 has at least a processor 104 for implementing programs 108 and 110. To this end, the purpose of said program 108 is to encode or decode data, while said program 110 serves to initially generate different keys and pointers.

The computer 100 is provided with an interface 106. To this end, said interface 106 serves as a connection to the network 124, for example. This interface can also be developed as a card reader, by means of which the computer 100 can read a chip card 112 by using said interface 106.

In this process, the chip card 112 makes it possible to store a virtual patient file on the data server 126. The data 130 stored on said data server 126 can only be accessed by using said chip card 112.

The chip card comprises a memory 114 and a processor 116. The chip card 112 communicates with the computer 100 or with its interface 106 via the interface 118.

Various parameters are stored in the non-volatile memory 114, such as for example an index "$i_0$" 120, as well as various keys and pointers 122. The index $i_0$ 120 can be read out from the memory 114, modified and again stored in the memory 114. The parameters 122, in contrast, are permanently stored in the non-volatile memory 114 and can also not be read out from there. The processor 116 uses said parameters 122 for recursively generating keys and pointers, with said recursively generated keys and pointers being returned to the computer 100 via the interface 118. The GUID (Global Unique Identifier) is an exception in this connection, which is a one-to-one patient identification and is read out by said computer 100 and can be transferred to the data server 126 in conjunction with the data in an encoded form. To store the data 103 on the data server 126 the following approach can for example be taken:

If a patient visits a doctor's office with the computer 100, a check is first conducted, if the patient is already in possession of the chip card 112.

The whole purpose of said chip card 112 in this connection is to use said chip card 112 as an electronic health service smart card. Thus, in addition to the parameters 120 and 122, a patient's personal information can also be stored in the memory 114 of the chip card 112. This information comprises data regarding emergency care, a record of currently taken medication, remarks on the organ donor status, the patient's name and address, health insurance information, and much more. Access to corresponding areas of the chip card may be protected by a PIN, for example, making it impossible to access the memory 114 without the patient's consent.

If a patient is not in possession of a corresponding chip card 112, such card is handed to him by the doctor's office, and the chip card is initialized for use. Such initialization comprises generating the parameters $K_0$, $P_0$, $HP_K$, $HK_K$, as well as the one-to-one patient identification GUID by the program 110 of the computer 100. $K_0$ in this connection represents a random key, $P_0$ is a random pointer, $HP_K$ a random key, $HK_K$ also represents a random key, with $K_0$, $P_0$, $HP_K$, $HK_K$ and GUID being in the memory 114 of said chip card 112 without the possibility of modification.

Alternatively, instead of having the chip card's initializing parameters $K_0$, $P_0$, $HP_K$, $HK_K$ generated by the doctor's office, it is also possible to have the chip card—already initialized with the permanently stored parameters $K_0$, $P_0$, $HP_K$, $HK_K$ as well as a GUID—supplied, for example, by a chip card manufacturer to the doctor's office. Generally, it should be noted that preferably access to the chip card 112 is protected by a PIN, or the like, so that only authorized persons can read out and write data from and to the chip card 112 and/or generate pointers and keys by said chip card 112.

For data protection said five values $K_0$, $P_0$, $HP_K$, $HK_K$ and the GUID are also stored in a secure environment on the computer 100, making unauthorized access by outsiders to such parameters impossible. This is necessary, if the patient were to lose his chip card 112, and thus access to his patient data, stored on the data server 126, would no longer be possible. Moreover, during the card's initialization an index $i_0$=0 is stored in the memory 114 of the chip card. Said index $i_0$ can be read out, and modified by the computer 100 and newly stored on the chip card 112. Furthermore, every time the index $i_0$ is modified, a copy of the current index $i_0$ should be stored on the data server 126, making it also possible to recall the current status of the index $i_0$ at all times in the event the chip card 112 is lost. If need be, the index $i_0$ may be encoded with $K_0$, for example, on the data server 126 in this connection.

If new patient data 103 are to be stored on the data server 126, the patient inserts his chip card 112 into a corresponding card reader, developed at the computer 110. Alternatively, the option to conduct such communication between said chip card 112 and said computer 100 by wireless interface also suggests itself. To store said data 103 on the data server 126, the processor 116—by using the parameters $K_0$, $P_0$, $HP_K$ and $HK_K$—recursively generates a data key usable for the data 103 and a data pointer. The data key and the data pointer are transferred to the computer 100 via the interface 118, and said data 103 are encoded via the data key by means of the module 108 of the processor 104. Optionally in unencoded form, meta information is additionally attached to the encoded data, with said meta information specifying, for example, the category of the data, such as image data or prescription data, as well as a type of specialist based on a coding, e.g. in a 512-bit field.

Along with the data, the GUID read out from the memory 114 of the chip card 112 is also encoded. The purpose of said encoding of the GUID, along with the data 103, is that the data server 126 can clearly verify—if data are decoded following a subsequent recall of patient data—that the recalled data actually belong to the patient with said chip card 112, or to his GUID.

The encoded data, along with the attached meta information, as well as the data pointer generated by the processor 116, are transferred to the data server 126 as data package 136 via the network 124. The data encoded with the data key, along with the attached meta information, are then stored on the data server 126 as data entry 130, with said storage taking place in the memory area 128 identified by the pointer generated by the computer 100. At the same time, an entry is made in the history table 134 to the effect that said computer system 100 stored data in the memory area identified by the pointer 128.

The way data entries 130 are recalled is similar to the way data are stored. To recall data the patient, for example, reinserts his chip card 112 into a corresponding reader of the computer 100 at the doctor's office. The computer 100 then reads out the index $i_0$ 120 from the memory 114 of the chip card 112, as well as the GUID. The purpose of the index $i_0$ in this connection is to inform the computer 100 or the processor 116 about the number of data entries 130 for the patient stored on the data server 126. Typically, an index $i_0$=5 is stored in the memory 144 of the chip card 112 after five visits to the doctor.

For the computer 100 to become aware of the stored data entries 130 on the data server 126, pointers and keys are recursively generated on the chip card 112 by the processor 116, with corresponding recursions carried out five times in the present case ($i_0$=5) by using the parameters $K_0$, $P_0$, $HP_K$ and $HK_K$.

By using the pointers recursively generated by the chip card 112, the computer 100 accesses the data server 126 via the network 124 to recall meta information stored in memory areas identified by the pointers 128. Such meta information is then transferred back to the computer system 100, where it can be checked for corresponding meta information codings. If, for example, the computer 100 is a client used in a dental office, the attending physician would usually only be interested in data packages 130 stored on the data server 126 that contain information relevant to dental offices. Thus, the data entries 130 to be completely downloaded from the data server 126 to the computer 100 via the network 124 can be selected by analyzing the meta information by means of the computer 100.

After selecting the relevant data entries 130 the corresponding associated pointers are transferred to the data server 126. Relevant data entries 130 that are stored in the memory areas identified by the pointers 128 are transferred as data packages 140 via the network 124 to the computer 100. There, the processor 104, or the corresponding computer program 108, decodes the encoded data correspondingly by using the key recursively generated previously by the processor 116.

To ensure that the correspondingly decoded data actually belong to the patient with said chip card 112, the computer 100 checks the GUID contained in the decoded data and compares it with the GUID stored on the chip card 112 in the memory 114. If both GUIDs match, it is assured that the recalled data belong to the patient with said chip card 112 with absolute certainty.

To enable such an allocation—feasible with absolute certainty—of data with attached GUID to a patient and GUID stored on his chip card 112, a one-to-one issuance of GUIDs must be guaranteed. This can be accomplished, for example, with the following approach: A GUID is generated in the computer 100 upon initialization of the card. Said GUID is converted into a hash value by means of a standard hash function (such as for example RIPEMD-256) and transferred to the data server 126 as GUID information 138. Said GUID information 138 is then harmonized with a list 132, which is stored on the data server 126. In this process, said list 132 contains all GUID information 138 that has thus far been issued to all patients. If, for example, a duplicate of the just transmitted GUID information 138 is found on the list 132, the data server 126 sends a GUID reply 142 to the computer 100 stating "GUID assigned." The computer 100 then generates a new random GUID, which again is converted into a hash value via a standard hash function and transmitted to the data server 126. If such newly created GUID information 138 cannot be found in the list 132, such GUID information is added to said list 132. The GUID reply generated by the data server 126 then states, for example, "GUID accepted." The computer 100 subsequently stores the generated GUID in the non-volatile memory 114 of the chip card 112.

The advantage of this method is that no data whatsoever are translated into clear text via the network 124 that could be spied out by unauthorized users and utilized in connection with a data abuse. Only hash values in the form of GUID information 138 are transmitted to the data server 126 via said network 124, which make it virtually impossible to draw conclusions to a corresponding patient identification in the form of the GUID. However, the use of hash values is problematic in that the same hash value can be calculated when using two different input data sets. This event referred to as a "collision" may however be minimized by using specific hash functions, i.e. certain algorithms such as for example said standard hash function RIPEMD-256. This way, the probability that a hash function generates a collision is reduced to $1:2^{256}$, which is approximately $9 \times 10^{-78}$. Thus, generating a collision by the hash function is nearly impossible.

It should be noted that a lot of information contained in the data packages 136 can also be transmitted to the data server 126 in unencoded form in addition to the encoded data, as well as the meta information. This may comprise, for example, special markers in the form of flags, with said flags being commands for deleting, processing or adding data.

It is also possible to store access authorizations along with the encoded data and the meta information in one data entry 130 on the data server 126. Preferably, said access authorizations are stored along with said meta information in this connection. To this end, said access authorizations may be stored in a bit field with a predetermined length of, for example, 512 bits.

Figure 2:
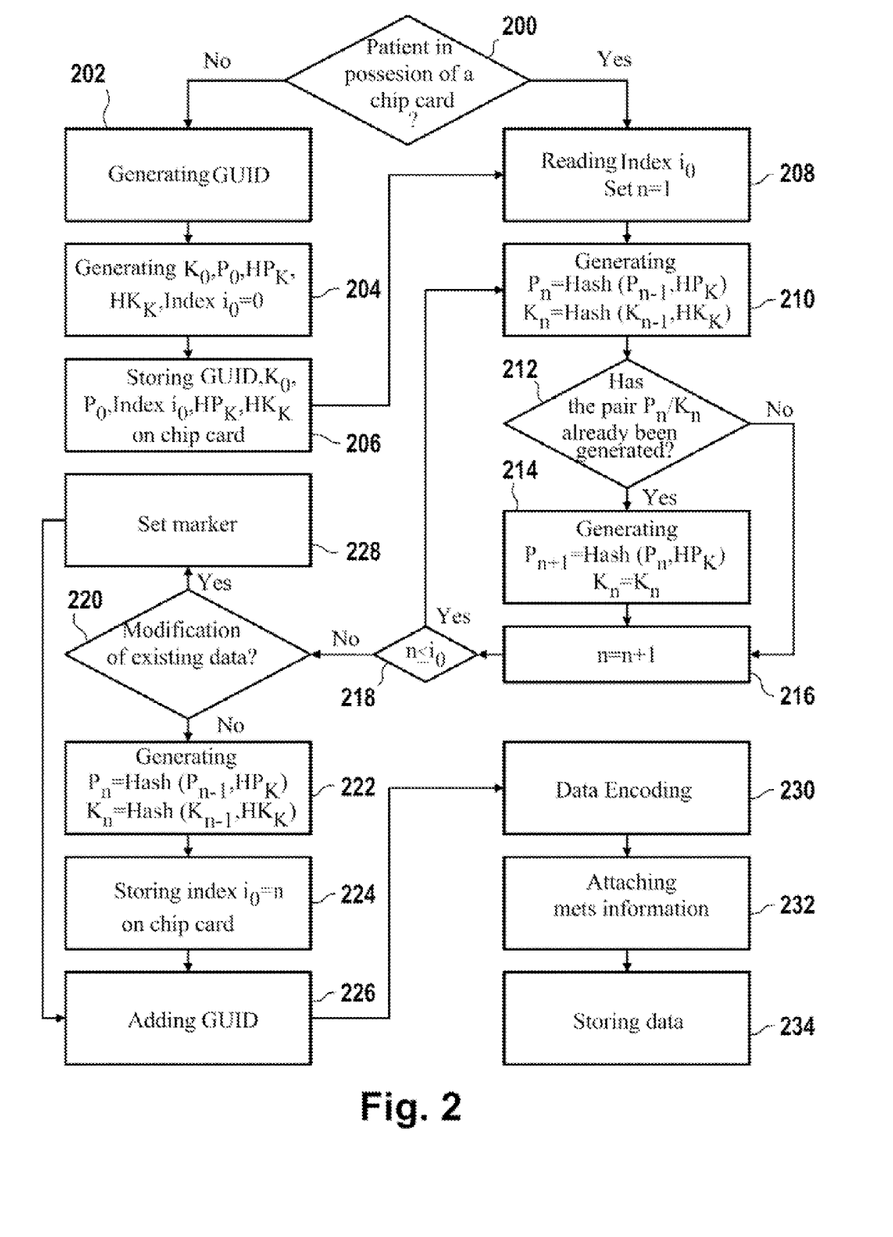
FIG. 2: shows a flow chart of a method for storing patient data according to the invention.

FIG. 2 shows a flow chart of a method for storing patient data according to the invention. In step 200 the computer system of a doctor's office checks, for example, if a patient is in possession of a chip card with the 4 values $K_0$, $P_0$, $HP_K$, $HK_K$ and a GUID already stored. If this is not the case, the computer system of the doctor's office generates a one-to-one patient identification in the form of a GUID (Global Unique Identifier) once. The computer system of the doctor's office generates the GUID in step 202. Moreover, the parameters $K_0$, $P_0$, $HP_K$, $HK_K$ are generated in step 204. In this connection, $K_0$ concerns a random key, $P_0$ a random pointer, $HP_K$ a random key, and $HK_0$ also a random key. In step 206 the generated GUID $K_0$, $P_0$, $HP_K$, $HK_K$ are stored on a new chip card, which is assigned to the patient. Moreover, said information is stored in a secure area of the doctor information system as a backup copy. Additionally, an index $i_0$ is stored on the patient's chip card in step 206, with said index $i_0$ being set to $i_0=0$ when the chip card is first used, namely during initialization.

Reading the index $i_0$ takes place in step 208 either after first initializing the chip card or after a patient is already in possession of a chip card with the corresponding information $K_0$, $P_0$, $HP_K$, $HK_K$, $i_0$ and the GUID. The hash values are generated in step 210, with such generating taking place recursively. Overall, i-pointers and key pairs are calculated, with the formation of the pointers and the key list being simple and of high performance, since hash functions constitute quick calculation methods. The pointers are generated via the function $P_n=\text{Hash}(P_{n-1}, HP_K)$ and the keys are generated via the recursive hash function $K_n=\text{Hash}(K_{n-1}, HK_K)$. $i_0$ pointers and key pairs are calculated using $1 \leq n \leq i_0$, which can be used to access stored and decode data. To begin with, n=1 is used for the first dataset to be stored or queried.

Using the key hash algorithm guarantees that only the holder of the key $H_K$ can generate the pointer and key list, or the entire sequence or portions thereof. Thus, without the presence of the chip card (or the $H_K$ value) no sequential pointers or keys can be derived from a known pointer or key. Thus, the sequence of the data stored on the data server remains virtually anonymous and cannot be derived by database administrators or others persons with access to the data server either. At no point in time are the keys located on the data server; the same applies to the pointers as to any reference to the respective patient and as to the reference of the pointers among each other.

Since, as already mentioned, hash functions may generate collisions, which means that the same two hash values can be generated from a different source quantity, it must assured that such extremely rare collisions do not lead to the inability or to the erroneous ability of assigning decoded data to a patient or to his patient file. The objective is to prevent the extremely unlikely event that a pointer/key pair occurs twice for the same patient. In this case, two different data sets from the same patient would be encoded with the same key and, furthermore, stored in the same memory area on the data server. Thus, clearly assigning said dataset to the pointer would no longer be possible.

To avoid this, the resulting pointer/key pair is held in the memory of the physician's computer after the first pointer and key are generated in step 210. Thus, whether or not a duplicate of the just generated pointer/key pair was already previously generated can be checked in step 212. If such an extremely unlikely event should occur, a new pointer is subsequently simply generated in step 214, but the already generated key will be retained. The resulting new pointer is $P_{n+1}=\text{Hash}(P_n, HP_K)$ and $K_n=K_n$. Subsequently, the indexed variable is increased by n=n+1 in step 216. Said step 216 is also performed, if, as must be assumed under normal circumstances, a corresponding pointer/key pair as such cannot be found in step 212.

Steps 210 through 216 are then continuously repeated, until it is determined in step 218 that n is no longer smaller or equal to the index $i_0$. If n is no longer $\leq i_0$, all pointer/key pairs necessary to recall stored and encoded data from the data server have been generated. If, for example, the index is $i_0=5$, which means that a total of five data sets exist, and one collision was not detected in step 212, a total of five clear pointer/key pairs result, which can now be used according to step 218 to recall corresponding data from the data server. In this connection, the data are stored in the memory areas identified by the pointers $P_n$ of the data server and encoded with the relevant keys $K_n$.

In the present case, the objective is to examine particularly the storage and modification of existing data on the data server. In step 220 it is determined, whether already existing data should be modified, or if data should be stored on the server in a dataset newly to be created. For example, in the case of modifying already existing data a corresponding marker can be set in step 228. This is followed by adding the GUID—read out from the patient's chip card—to the data to identify the data as associated with said patient on a one-to-one basis.

If modifying existing data is not desired, i.e. completely new data are to be stored on the data server, an additional pointer/key pair with $P_n=\text{Hash}(P_{n-1}, HP_K)$ and $K_n=\text{Hash}(K_{n-1}, HK_K)$ is generated in step 222 following the query in step 220. Although not shown here, here too it is necessary to check, if an already existing pointer/key pair has been generated. In this case, the approach in generating a clear pointer/key pair is analogous to the steps 212 through 216. After generating the new pointer/key pair, the new index $i_0=n$ is stored on the chip card in step 224. This is necessary so that the corresponding key pairs can be generated during the next doctor's visit to ensure that all data sets will be retrieved.

After implementing step 224, the one-to-one user identification GUID is again added to the data in step 226. In step 230, the data are encoded by means of the corresponding data key. This concerns the key $K_n$ for data newly to be stored. Data that are to be modified will be encoded with the key associated with data sets to be modified in step 230.

Finally, in step 232, meta information is attached to the encoded data, with the meta information attached in clear text in unencoded form.

Depending on the marking set in step 228, data are deleted, overwritten or additionally attached in step 234. If no marking was set in step 228, since no modification of existing data was desired, the data are stored in a memory area of the server identified by the pointer $P_n$ in step 234.

It should be noted that adding data to an already existing encoded dataset stored in a specific memory area is preferably not intended. Rather, in such a case it is intended that data to be added generally be stored in a new memory area. To be able to track the deletion or modification of data, corresponding accesses and data modifications are also logged in a history table on the data server.

Figure 3:
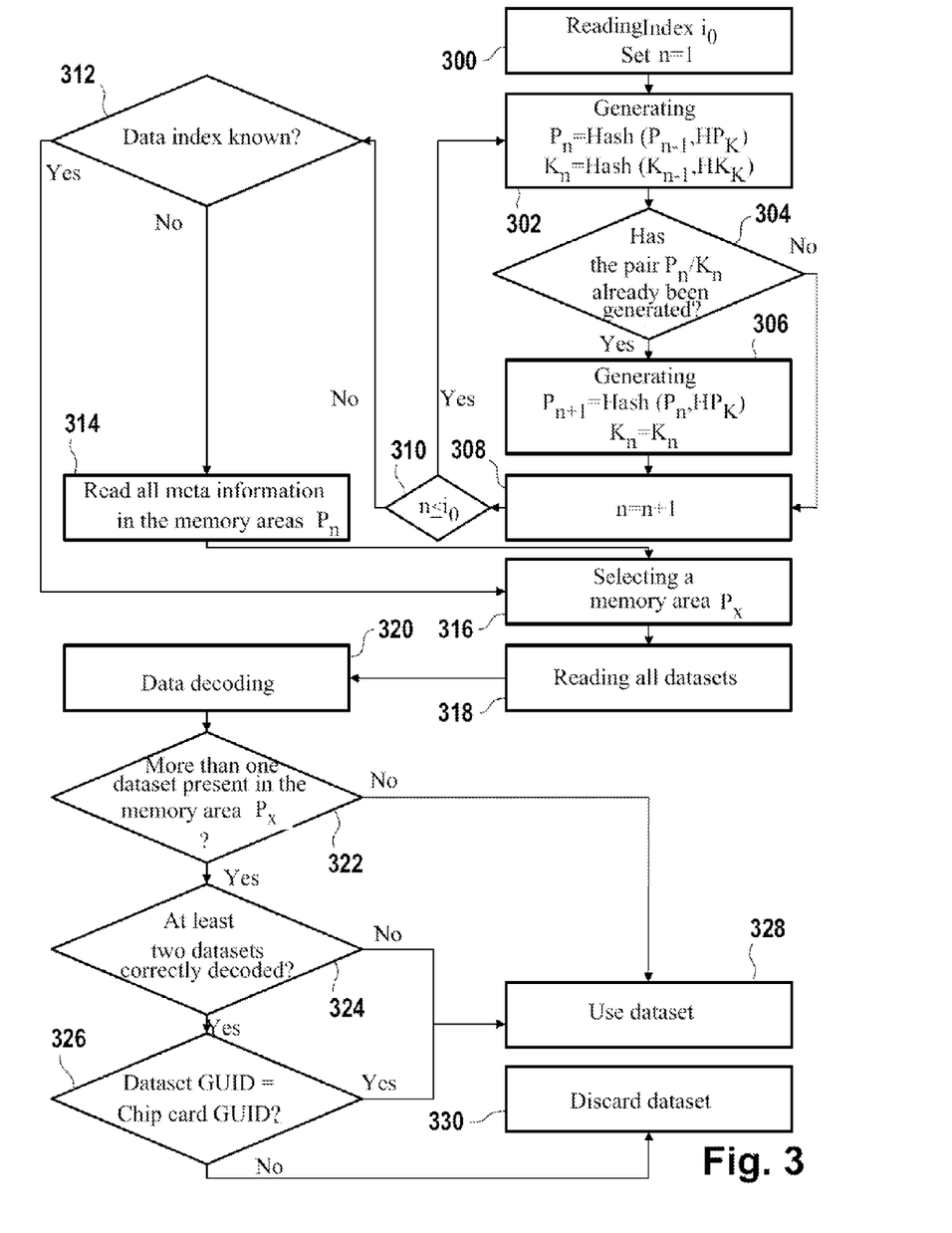
FIG. 3: shows a flow chart of a method for querying patient data according to the invention.

FIG. 3 shows a flow chart of a method according to the invention for querying patient data. The index $i_0$ is read from the chip card in step 300. Furthermore, the indexed variable is set at n=1. In step 302 the recursive generating of pointer/key pairs takes place via hash functions. The pointers are again calculated via $P_n=\text{hash}(P_{n-1}, HP_K)$ and the keys are again calculated via $K_n=\text{hash}(K_{n-1}, HK_K)$. In this connection, a reliable hash algorithm, such as for example the keyed RIP-EMD algorithm, may be used as hash function. Whether or not the just created pointer/key pair was already generated before in a step 302 is again checked in step 304. The purpose again is to avoid collisions with identical pointer/key pairs. If such a pair $P_n/K_n$ was already generated, an additional pointer is generated in step 306; however, the key $K_n$ is retained with $K_n=K_n$. Subsequently, the indexed variable n is increased by 1 (n=n+1) in step 308.

If it was determined in step 304 that a generated pointer/key pair has not yet been generated before, step 304 is immediately followed by step 308 with n=n+1, whereupon step 310—after step 308—checks, whether the number of generated pointer/key pairs corresponds to the number of datasets given by the index $i_0$. If n is $\leq i_0$, the recursion is continued by carrying out steps 302 through 308 after step 310. If, however, n is $>i_0$ in step 310, a query is initiated in step 312 to determine, if the querying computer system is already familiar with a certain data index "x". This query in step 312 is for example useful, if an attending physician stored data on the data server during a treatment session, and if said physician wants to recall such earlier stored data again. In this case, direct access by the physician's computer system to the data server to read out the dataset identified by the data index and the corresponding pointer is instantly possible.

Usually, however, a desired data index is not known beforehand, so that after the query in step 312 all meta information in the memory areas $P_x$ ($1 \leq x \leq i_0$) is read out by the physicians' information system. On the basis of the read-out meta information a desired dataset "x" is selected in step 316, which is to be retrieved from the data server. This step 316 also takes place alternatively, if the data index was predetermined in step 312. In step 318 all datasets stored in the memory area Px are read, whereupon said datasets are decoded in step 320 with the associated data key $K_x$.

Whether or not more than one dataset exists in the memory area $P_x$ is then determined in step 322. This unlikely event may occur, since hash functions, and thus the generating of random memory areas $P_x$, are not necessary collision free. In this case it must be assured that different datasets—associated with different patients—can still be clearly attributed to a patient. Thus, if more than one dataset exists in the memory area $P_x$, step 324—after the query in step 322—checks which of the datasets were correctly decoded. Thus, if several datasets with the same pointer $P_x$ are found, it is still highly likely that the used keys $K_x$ employed to encode the relevant datasets $P_x$ are different. Thus, only the "correct" dataset can be decoded by means of the key $K_x$ matching the generated pointer $P_x$. Since only one dataset can be correctly decoded in step 324, only said correctly decoded dataset is used in step 328.

In the extremely unlikely event that two data sets from different patients were stored with the same pointer/key pairs in the same memory area of the server, and—in the process—were encoded with the same key, step 326 checks, which of the datasets features a GUID that corresponds to the GUID of the patient with the corresponding chip card. Thus, only the dataset with clearly attributable GUIDs is used in step 328. In contrast, the dataset that contains the GUID of a different patient is discarded in step 330.

Figure 4:
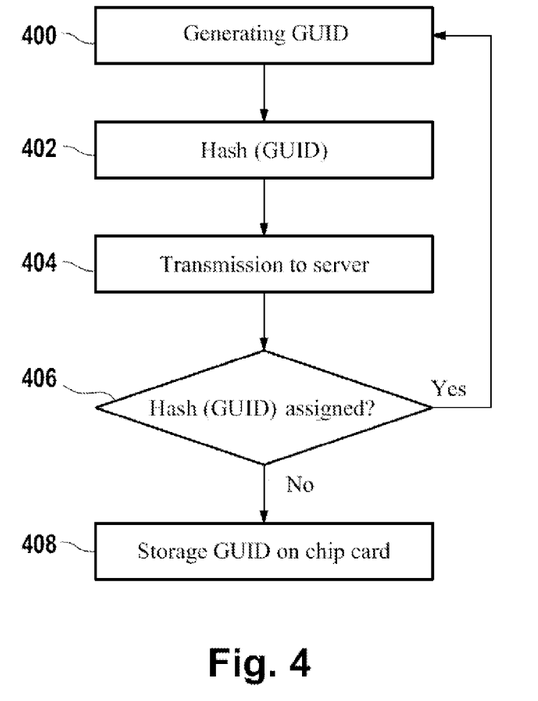
FIG. 4: shows a flow chart of a method for generating a GUID according to the invention.

FIG. 4 shows a flow chart of a method according to the invention for generating a GUID. A one-to-one user identification is generated by the physician's computer system in step 400. Said one-to-one user identification is generated once when the patient card, namely a chip card, is assigned by the computer system of a doctor's office, and then serves to clearly identify a patient via a corresponding identification.

However, to ensure said clear identification, an adjustment with a database, which stores all GUIDS already generated, must take place. Since, however, storing GUIDs in unencoded form in clear text presents a security risk, the approach to adjust the data is as follows: After generating the GUID in step 400, said GUID is converted into a hash value by means of a standard hash function (e.g. RIPEMD-256).

After this conversion in step 402, the hash value is transmitted to the data server in step 404. In this connection, the data server maintains a table about the hash values of all GUIDs already assigned.

To prevent that the GUIDs are read out by an administrator, for example, said table only stores the hash values of the assigned GUIDs. Moreover, as a result of adjusting the hash values of the assigned GUIDs collisions of the hash values are intercepted. The server checks in step 406, if such a GUID, or a corresponding hash value, was assigned to a patient. If this is the case in step 406, the server sends a reply to the physicians' information system, and said physicians' information system generates a new GUID by running through the steps 400 through 406. If successful, i.e. a corresponding GUID was not yet assigned, a message to that effect is also sent to said physicians' information system, whereupon the hash value of the GUID is stored in the list on the data server, and the drawn GUID is stored on the chip card in step 408 and used as the patient's one-to-one identification. By using only the hash value of the GUID on the data server it is impossible to recalculate the GUID.

REFERENCE LIST

100 Computer
102 Memory
103 Data
104 Processor
106 Interface
108 Computer program
110 Computer program
112 Chip card
114 Memory
116 Processor
118 Interface
120 Parameter
122 Parameter
124 Network
126 Data server
128 Pointer
130 Data entry
132 List
134 History table
136 Data package
138 GUID Information
140 Data package
142 GUID reply

The invention claimed is:

1. A method for generating a first key to encode and/or decode data and a first pointer, with said data stored in an encoded form and/or storable in an encoded form on a first data processing system in a memory area identified by said first pointer, comprising the following steps:

recursive generating of said first key from a second key, recursive generating of said first pointer from a second pointer, with the number of recursions for implementing the recursive generating of said first key and said first pointer determined by an index value, with generating said first key and generating said first pointer carried out by a processor of a portable data carrier, with the index value increased by one for data to be newly stored, and with said new index value stored on said portable data carrier, with storing said data in the first data processing system comprising the following steps:

encoding or decoding said data with the recursively generated first key by means of a second data processing system, and storing or querying said encoded data in or by the memory area of the first data processing system by means of said second data processing system, said memory area identified by the recursively generated first pointer, wherein the recursive generating of said first key from the second key and the recursive generating of said first pointer from the second pointer comprising the following steps:

generating said first key by using the second key and a third key, generating said first pointer by using the second pointer and a fourth key, and the following additional steps being repeated as frequently as the number that corresponds to the index value:

newly generating the first key by using the previously generated first key and the second key, newly generating the first pointer by using the previously generated first pointer and the fourth key.

2. The method in accordance with claim 1, with the index value ($i_0$; 120) increased by one, and a new additional first pointer recursively generated from the first pointer generated one recursion step earlier, with the earlier generated first pointer discarded, when the first key and the first pointer generated from the next previous recursion step correspond to a first pointer previously generated in any recursion step and to the first key generated earlier in said random recursion step.

3. A portable data carrier, comprising: a processor for generating a first key to encode and/or decode data and a first pointer, where said encoded data is stored and/or is storable and identified by the first pointer in a memory area of a first data processing system, means for recursively generating said first key from a second key, means for recursively generating said first pointer from a second pointer, wherein the number of recursions for implementing the recursive generating of said first key and said first pointer determined by the index value, said index value is increased by one for data to be newly stored, and said new index value is stored on the portable data carrier, wherein the portable data carrier further comprises:

means for generating the first key by using the second key and a third key, means for generating the first pointer by using the second pointer and a fourth key, means for newly generating the first key by using the previously generated first key and the second key, means for newly generating the first pointer by using the previously generated first pointer and the fourth key.

4. The portable data carrier in accordance with claim 3, with the first key and/or the first pointer being generated by the means for generating the first key and/or by the means for generating the first pointer by using a hash function.

5. The portable data carrier in accordance with claim 4, with the data comprising patient data.

6. The portable data carrier in accordance with claim 5, with the data comprising a one-to-one patient identification.

7. The portable data carrier in accordance with claim 3, with the second key and the third key and the fourth key and the second pointer and the index value and the one-to-one patient identification stored in a memory area of the portable data carrier on the basis of personalization, with said processor developed for generating said first key and/or said the first pointer.

8. The portable data carrier in accordance with claim 7, with said portable data carrier developed by a chip card.

9. A data processing device comprising means for communicating with a portable data carrier according to claim 3, comprising:
    means for assigning an index value to the data,
    means for encoding said data by means of the recursively generated first key, and
    means for storing said encoded data in a memory area of the first data processing system identified by the recursively generated first pointer.

10. The data processing device in accordance with claim 9, further comprising:
    means for querying the encoded data by a memory area of the first data processing system identified by the recursively generated first pointer, and
    means for decoding said encoded data by means of the recursively generated first key.

11. The data processing device in accordance with claim 9, further comprising means for additionally storing unencoded metadata in the memory area of the first data processing system identified by the recursively generated first pointer, with said metadata storable in a linked form with the data.

12. The data processing device in accordance with claim 9, further comprising means for querying the unencoded metadata by a memory area of the first data processing system identified by the recursively generated first pointer, with said metadata linked to the data in an unencoded form.

13. A non-transitory, computer readable storage medium containing computer program instructions executable by means of a computer processor and causing the processor to generating a first key to encode and/or decode data and a first pointer, with said data stored in an encoded form and/or storable in an encoded form on a first data processing system in a memory area identified by said first pointer, the action of generating the first key being carried out by the following steps:
    recursive generating of said first key from a second key, recursive generating of said first pointer from a second pointer, with the number of recursions for implementing the recursive generating of said first key and said first pointer determined by an index value, with generating said first key and generating said first pointer carried out by a processor of a portable data carrier, with the index value increased by one for data to be newly stored, and with said new index value stored on said portable data carrier, with storing said data in the first data processing system comprising the following steps:
    encoding or decoding said data with the recursively generated first key by means of a second data processing system, and
    storing or querying said encoded data in or by the memory area of the first data processing system by means of said second data processing system, said memory area identified by the recursively generated first pointer, and
    wherein the step of the recursive generating of said first key from the second key and the recursive generating of said first pointer from the second pointer comprising the following steps:
    generating said first key by using the second key and a third key, generating said first pointer by using the second pointer and a fourth key, and
    the following additional steps being repeated as frequently as the number that corresponds to the index value:
    newly generating the first key by using the previously generated first key and the second key, and
    newly generating the first pointer by using the previously generated first pointer and the fourth key.

14. The computer readable storage medium in accordance with claim 13, with the index value increased by one, and
    a new additional first pointer recursively generated from the first pointer generated one recursion step earlier, with the earlier generated first pointer discarded,
    when the first key and the first pointer generated from the next previous recursion step correspond to a first pointer previously generated in any recursion step and to the first key generated earlier in said random recursion step.

* * * * *